(12) United States Patent
Izenberg et al.

(10) Patent No.: US 11,163,719 B2
(45) Date of Patent: *Nov. 2, 2021

(54) HYBRID REMOTE DIRECT MEMORY ACCESS

(71) Applicant: Amazon Technologies, Inc., Seattle, WA (US)

(72) Inventors: Erez Izenberg, Tel Aviv (IL); Leah Shalev, Zichron Yaakov (IL); Georgy Machulsky, San Jose, CA (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/661,876

(22) Filed: Oct. 23, 2019

(65) Prior Publication Data

US 2020/0057747 A1 Feb. 20, 2020

Related U.S. Application Data

(63) Continuation of application No. 15/360,853, filed on Nov. 23, 2016, now Pat. No. 10,459,875, which is a continuation of application No. 14/066,798, filed on Oct. 30, 2013, now Pat. No. 9,525,734.

(51) Int. Cl.
*G06F 15/173* (2006.01)
*H04L 29/08* (2006.01)
*G06F 3/06* (2006.01)

(52) U.S. Cl.
CPC ........ *G06F 15/17331* (2013.01); *G06F 3/067* (2013.01); *G06F 3/0611* (2013.01); *G06F 3/0659* (2013.01); *H04L 67/1097* (2013.01)

(58) Field of Classification Search
CPC ...... G06F 3/0611; G06F 3/067; G06F 3/0659; G06F 15/17331
See application file for complete search history.

(56) References Cited

U.S. PATENT DOCUMENTS

| | | |
|---|---|---|
| 6,611,883 B1 | 8/2003 | Avery |
| 7,281,030 B1 | 10/2007 | Davis |
| 7,756,943 B1 | 7/2010 | Wong et al. |
| 8,775,718 B2 | 7/2014 | Kanevsky et al. |

(Continued)

OTHER PUBLICATIONS

U.S. Appl. No. 14/066,798, "Advisory Action", dated May 16, 2016, 5 pages.

(Continued)

*Primary Examiner* — Michael A Keller
*Assistant Examiner* — Jsing Forng Lin
(74) *Attorney, Agent, or Firm* — Weaver Austin Villeneuve & Sampson LLP

(57) ABSTRACT

A technique for remote direct memory access (RDMA) may include receiving a packet that was sent over a network, and determining the packet has metadata indicative of acceleration. The technique may also include selecting a queue having minimal storage stages to process the packet, and writing the data of the packet to an application memory using the datapath associated with the queue. Amended metadata can be generated to indicate that the data has been written to the application memory, and the amended metadata can be stored in a software accessible buffer.

20 Claims, 5 Drawing Sheets

(56) References Cited

U.S. PATENT DOCUMENTS

| | | | |
|---|---|---|---|
| 9,256,373 | B1 | 2/2016 | Liang et al. |
| 9,525,734 | B2 | 12/2016 | Izenberg et al. |
| 9,529,734 | B2 | 12/2016 | Asnaashari et al. |
| 2004/0225719 | A1 | 11/2004 | Kisley et al. |
| 2006/0101225 | A1 | 5/2006 | Aloni et al. |
| 2006/0173921 | A1 | 8/2006 | Jalonen |
| 2009/0089475 | A1 | 4/2009 | Chitlur et al. |
| 2010/0064070 | A1 | 3/2010 | Yoshimura et al. |
| 2011/0320804 | A1 | 12/2011 | Chan et al. |
| 2012/0192190 | A1* | 7/2012 | Basso ............... G06F 15/1735 718/102 |
| 2014/0280665 | A1 | 9/2014 | Decusatis et al. |
| 2014/0280666 | A1 | 9/2014 | Cardona et al. |
| 2014/0317221 | A1 | 10/2014 | Froening et al. |
| 2014/0325011 | A1 | 10/2014 | Guerin et al. |
| 2014/0359043 | A1 | 12/2014 | Gao et al. |
| 2015/0032835 | A1 | 1/2015 | Sharp et al. |
| 2017/0214774 | A1* | 7/2017 | Chen ...................... H04L 12/46 |

OTHER PUBLICATIONS

U.S. Appl. No. 14/066,798 , "Final Office Action", dated Mar. 2, 2016, 14 pages.

U.S. Appl. No. 14/066,798 , "Non-Final Office Action", dated Sep. 29, 2015, 12 pages.

U.S. Appl. No. 14/066,798 , "Notice of Allowance", dated Aug. 26, 2016, 13 pages.

U.S. Appl. No. 15/360,853 , "Advisory Action", dated Mar. 5, 2019, 5 pages.

U.S. Appl. No. 15/360,853 , "Final Office Action", dated Dec. 18, 2008, 17 pages.

U.S. Appl. No. 15/360,853 , "Non Final Office Action", dated May 31, 2018, 16 pages.

U.S. Appl. No. 15/360,853 , "Notice of Allowance", dated Jun. 19, 2019, 9 pages.

* cited by examiner

HYBRID REMOTE DIRECT MEMORY ACCESS

CROSS-REFERENCE TO RELATED APPLICATIONS

This application is a continuation of U.S. patent application Ser. No. 15/360,853, filed Nov. 23, 2016, issued as U.S. Pat. No. 10,459,875 on Oct. 29, 2019, and titled "HYBRID REMOTE DIRECT MEMORY ACCESS", which is a continuation of U.S. patent application Ser. No. 14/066,798 filed Oct. 30, 2013, issued as U.S. Pat. No. 9,525,734 on Dec. 20, 2016, and titled "HYBRID REMOTE DIRECT MEMORY ACCESS", the full disclosures of which are incorporated herein by reference for all purposes.

BACKGROUND

Remote direct memory access (RDMA) is a direct memory access from a memory of one computer into a memory of another computer without involving the operating system of either one of the computers (www.wikipedia.org).

There are different RDMA protocols such as but not limited to Infiniband, RoCE (RDMA over converged Ethernet) and iWARP. These protocols differ from each other and are relatively complex.

One solution for facilitating RDMA is purely hardware based and requires the network interface controllers of the different computers to be tailored to the RDMA protocol that is being used for conveying RDMA packets between the different computers. This solution exhibits high throughput, low latency and low central processing unit (CPU) loading but is complex and costly to design and is not flexible.

Another solution for facilitating RDMA is based on an RDMA software module that is hosted by the CPU. This RDMA software module can be adjusted to different RDMA protocols but exhibits a high latency, requires extensive usage of CPU resources and does not allow direct writing (zero copying) of data—as every transaction requires writing data to buffers of the operating system.

There is a growing need to provide a flexible and efficient RDMA solution.

SUMMARY

A method and a system are provided.

According to an embodiment of the invention there may be provided a method for hybrid remote direct memory access (RDMA), the method may include: (i) receiving, by a first computer, a packet that was sent over a network from a second computer; wherein the packet may include data and metadata; (ii) determining, in response to the metadata, whether the data should be (a) directly written to a first application memory of the first computer by a first hardware accelerator of the first computer; or (b) indirectly written to the first application memory; (iii) indirectly writing the data to the first application memory if it determined that the data should be indirectly written to the first application memory; (iv) if it determined that the data should be directly written to the first application memory then: (iv.a) directly writing, by the first hardware accelerator the data to the first application memory without writing the data to any buffer of the operating system; and (iv.b) informing a first RDMA software module, by the first hardware accelerator, that the data was directly written to the first application memory; and (v) notifying, by the first RDMA software module, a second computer about a completion of an RDMA transaction during which the data was directly written to the first application memory.

The method may include extracting from the metadata a target address within the first application memory to which to write the data.

The method may include sending the metadata to a buffer that is accessible by the first RDMA software module.

The method may include determining to directly write the data to the first application memory if the metadata may include a write request RDMA operation code.

The method may include determining to directly write the data to the first application memory if the metadata may include a read response RDMA operation code.

The method may include determining to directly write the data to the first application memory if the metadata is indicative that the RDMA transaction is associated with an acceleration allegeable application.

The method may include checking a validity of the metadata by the first hardware accelerator and preventing the data from being directly written to the first application memory if the metadata is found to be invalid.

The method wherein the receiving of the packet is executed by a general purpose network interface controller.

The method may include performing at least one out of error detection of the data and error correction of the data by the first hardware accelerator.

The method may include preventing from indirectly writing the data by the first RDMA software module after being notified, by the first hardware accelerator that the data was directly written to the first application memory.

The method may include storing by the first hardware accelerator a target address within the first application memory to which to write the data of the packet.

According to an embodiment of the invention there may be provided a system for remote direct memory access (RDMA), the system may include (i) a network interface controller; (ii) a processor that may be arranged to host an operating system, an application and a first RDMA software module; (iii) a first hardware accelerator; (iv) a first application memory. The network interface controller may be arranged to receive a packet that was sent over a network from a second computer to a first computer. The packet may include data and metadata. The first hardware accelerator may be arranged to: determine, in response to the metadata, whether the data should be (a) directly written to the first application memory by the first hardware accelerator; or (b) indirectly written to the first application memory.

The system may be arranged to indirectly write the data to the first application memory if it determined that the data should be indirectly written to the first application memory.

If it determined that the data should be directly written to the first application memory then: the first hardware accelerator may be arranged to directly write the data to the first application memory without writing the data to any buffer of the operating system; and inform the first RDMA software module that the data was directly written to the first application memory; and the first RDMA software module may be arranged to notify a second computer about a completion of an RDMA transaction during which the data was directly written to the first application memory.

The first hardware accelerator may be arranged to extract from the metadata a target address within the first application memory to which to write the data.

The first hardware accelerator may be arranged to send the metadata to a buffer that is accessible by the first RDMA software module.

The first hardware accelerator may be arranged to determine to directly write the data to the first application memory if the metadata may include a write request RDMA operation code.

The first hardware accelerator may be arranged to determine to directly write the data to the first application memory if the metadata may include a read response RDMA operation code.

The first hardware accelerator may be arranged to determine to directly write the data to the first application memory if the metadata is indicative that the RDMA transaction is associated with an acceleration allegeable application.

The first hardware accelerator may be arranged to check a validity of the metadata by the first hardware accelerator and prevent the data from being directly written to the first application memory if the metadata is found to be invalid.

The network interface controller is a general purpose network interface controller.

The first hardware accelerator may be arranged to store a target address within the first application memory to which to write the data of the packet.

The first hardware accelerator may be arranged to perform at least one out of error detection of the data and error correction of the data by the first hardware accelerator.

The first RDMA software module may be arranged to prevent indirectly writing the data after being notified that the data was directly written to the first application memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
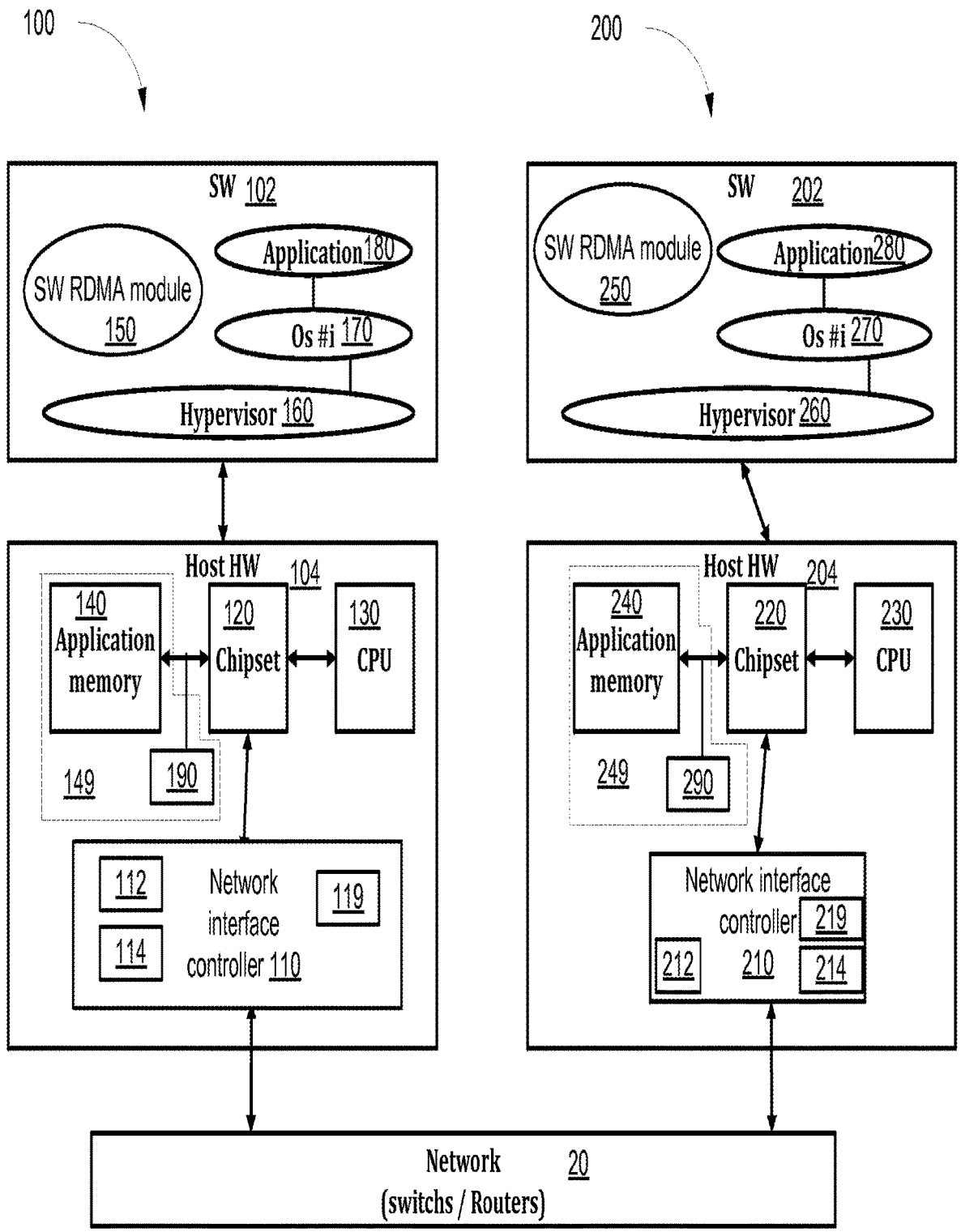
FIG. 1 illustrates two computers and a network that couples these computers to each other, according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

According to various embodiments of the invention there are provided systems and methods for hybrid RDMA. The RDMA is hybrid in the sense that RDMA operations that are deemed to be accelerated are partially executed by a hardware accelerator and partially executed by a RDMA software module.

FIG. 1 illustrates two computers 100 and 200 and a network 20 that couples these computers to each other, according to an embodiment of the invention. First computer 100 includes hardware components such as first network interface controller (first NIC) 110, first chipset 120, a first processor such as a first central processing unit (CPU) 130, and a first local memory module (also referred to as first application memory) 140 and first buffers such as first operating system buffers 190. The first chipset 120 may connect CPU 130 to the application memory 140 and to peripherals.

The chipset 120 may include a memory controller and some extension buses to connect cards (for example NIC or graphic cards . . . ).

Both memory modules 140 and 190 can belong to first host memory module 149.

The first computer 100 hosts software components such as first hypervisor 160, one or more first operating systems (such as Os # i) 170, first application 180 and first software RDMA module 150. These software components can be hosted by the first processor 130 but can be hosted by other hardware components of first computer 100.

The network interface controller 110 can include a first hardware accelerator 112 and a first DMA controller 114.

Second computer 200 includes hardware components such as second network interface controller (second NIC) 210, second chipset 220, a second processor such as second CPU 230, and a second local memory module (also referred to as second application memory) 240 and second buffers such as second operating system buffers 290. Both memory modules 240 and 290 can belong to second host memory module 249.

The second network interface controller 210 can include a second hardware accelerator 212 and a second DMA controller 214.

The second computer 200 hosts software components such as second hypervisor 260, one or more second operating systems (such as Os # i) 270, second application 280 and a second software RDMA module 250. These software components can be hosted by the second processor 230 but can be hosted by other hardware components of second computer 200.

Both computers 100 and 200 can exchange packets (including but not limited to RDMA packets) between each other and accelerate the processing of at least some RDMA packets. It is noted that a computer with accelerated RDMA can work with another host with standard hardware or software RDMA implementation.

The following explanation will refer to an acceleration that was done by the first computer 100 although the second computer 200 can be arranged to perform the same acceleration.

Even though some of the examples refer to RoCE protocol it can be applied, mutatis mutandis to other protocols. A hardware accelerator can include configurable modules that can be configured to manage different RDMA protocols. Additionally or alternatively, there may be separate hardware accelerators or separate modules of the hardware accelerator for managing different RDMA protocols.

The network interface controller 110 is arranged to receive a packet that was sent over network 20 from second computer 200. The packet may include data and metadata (see, for example, metadata 41 and data 42 of RDMA packet 40 of FIG. 3).

The first hardware accelerator 112 is arranged to determine, in response to the metadata, whether the data should be (a) directly written to the first application memory by the first hardware accelerator; or (b) indirectly written to the first application memory through operating system buffer 190.

The first computer 100 (and especially a combination of the first network interface controller 110 and the first software RDMA module 150) can be arranged to indirectly write the data to the first application memory 140 if it determined that the data should be indirectly written to the first application memory 140. The first application memory 140 is a memory module that can be accessed by applications hosted by a computer.

If it determined that the data should be directly written to the first application memory 140 then the first hardware accelerator 112 is arranged to directly write the data to the first application memory 140 without writing the data to any buffer (190) of the operating system and inform the first RDMA software module 150 that the data was directly written to the first application memory. In both cases the first RDMA software module 150 is arranged to notify the second computer 200 about a completion of an RDMA transaction during which the data was written to the first application memory.

Figure 2:
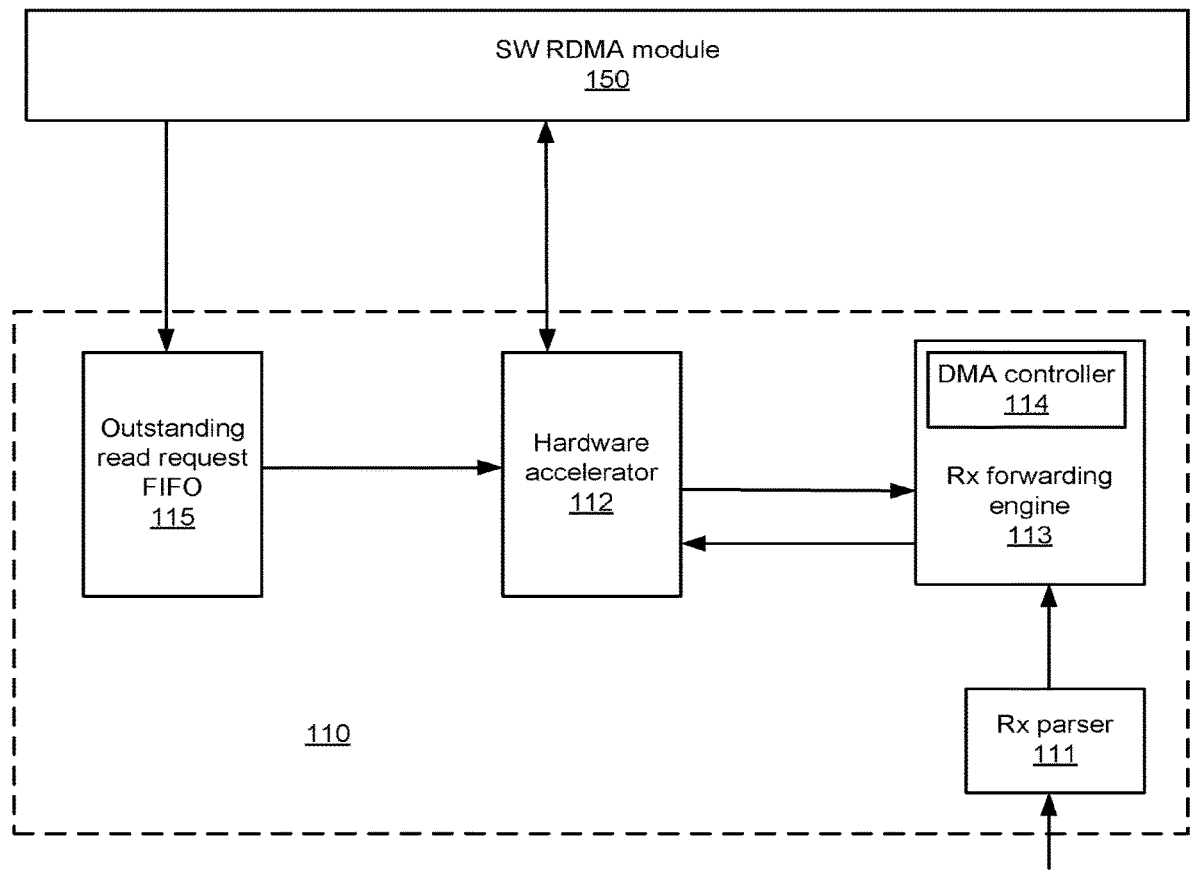
FIG. 2 illustrates the first software RDMA module and the first network interface controller according to an embodiment of the invention.

FIG. 2 illustrates the first software RDMA module 150 and the first network interface controller 110 according to an embodiment of the invention.

The first network interface controller 110 includes a receive path (rx) parser, 111, an rx forwarding engine 113 (that includes first DMA controller 114), first hardware accelerator 112 and outstanding read request FIFO 115.

The acceleration can be applied to all RDMA operations, most common RDMA operations are: READ, WRITE and ATOMIC.

READ operation and ATOMIC operations are usually split to 2 transactions: the requester send RDMA request packet (with all the required information where to read the data from), this packet doesn't need to be accelerated because it's a control packet and doesn't includes the data.

The responder replies with a RDMA response packet (for RDMA READ, the RESPONSE packet includes the read data) the response packet includes the actual data and this packet need to be accelerated by directly write the data to the requested memory.

When a RESPONSE packet is received, it needs to be matched to the REQUEST packet that was sent and there might be multiple outstanding requests so each response need to be validated against the related requests.

Therefore—the requests are saved in outstanding request FIFO waiting for the arrival of the response packets.

It is noted that the request may also include some additional information for example the address where to put the read data.

The rx parser 111 receives packets from the network 20, parses the packets to separate their metadata (such as header metadata) from data and sends the metadata and the data to the re forwarding engine 113.

The Rx forwarding engine 113 may process the metadata to determine whether the packet is a candidate for acceleration or not. The rx forwarding engine 113 may determine if the packet is an RDMA packet or not.

If the packet is not a candidate then the packet is processed in a non-accelerated manner—it is indirectly written to the first application memory 140. This involves writing the packet to a buffer 190, and having the first software RDMA module 150 processes the packet and copies the packet from the buffer 190 to the first application memory 140. The DMA controller 114 may manage the writing to the buffer and may also manage the writing from the buffer 190 to the first application memory 140.

If the packet is a candidate for acceleration (for example it is an RDMA packet) then it is sent to the hardware accelerator 112. The acceleration involves performing zero-copying of the data—the data is written directly to the first application memory 140 without being written to the operating system buffer 190.

The hardware accelerator 112 can perform some protocol specific validation such as sequence number check to detect lost packets and reordering issues.

The hardware accelerator 112 may determine whether to accelerate the processing of the packet. It may perform validation checks of various fields of the packet to determine that the packet is not corrupted, check whether the type of RDMA operation associated with the packet mandates an acceleration (in case that only some RDMA operations should be accelerated) and may check whether the target or destination of the packet indicate that the packet should be processed in an accelerated manner (in case that the acceleration is dependent upon such parameters).

For example, the first computer 100 can maintain multiple queues—one for each destination, one for each origin or a combination thereof. The system can determine which queues should be associated with the acceleration and accelerate only packets destined to these queues. These queues can be arranged in pairs of queues—QP (Queue pairs). QP are defined by the RoCE and Infiniband standards as sets of TX+RX queues which are used to submit work requests, these are not part of the OS but part of the RDMA solutions, they are usually implemented within the RDMA NIC hardware and driver and used by the application. The QPs are the building blocks that are used by the application to communicate and post RDMA commands to the NIC. FIG. 1 illustrates first NIC 111 as including QPs 119 and second NIC as including QPs 129.

Figure 3:
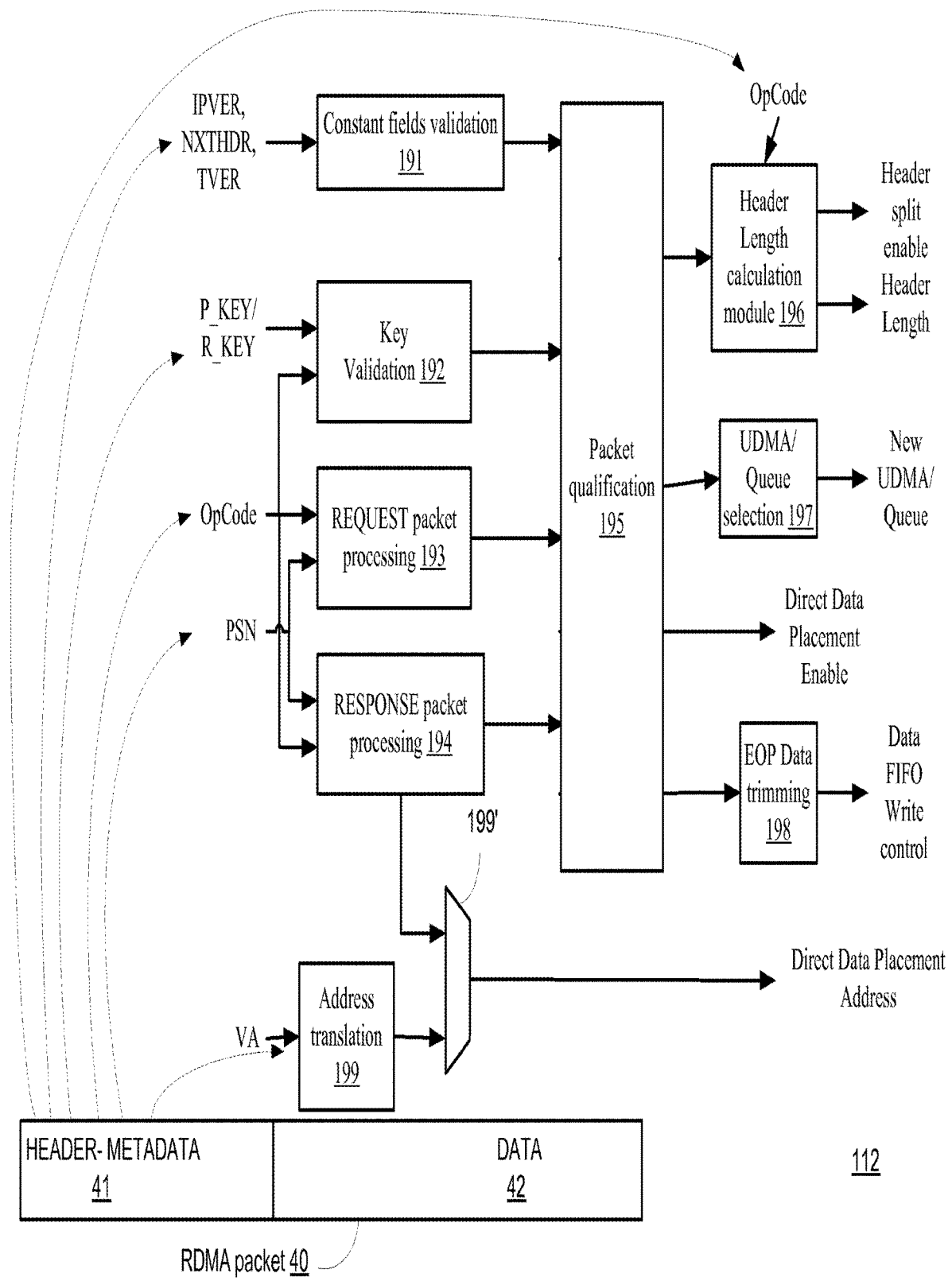
FIG. 3 illustrates an RDMA packet and the hardware accelerator according to an embodiment of the invention.

FIG. 3 illustrates an RDMA packet 50 and the hardware accelerator 112 according to an embodiment of the invention.

The hardware accelerator 112 includes a constant fields validation module 191, a key validation module 192, a request packet processing module 193, a response packet processing module 194, an address translation module 199, a multiplexer 199', a packet qualification module 195, a header length calculation module 196, a DMA/Queue selection module 197, and an end of packet (EOP) data trimming module 198.

The constant fields validation module 191 is arranged to validate various constants of the metadata 41—such as constants IPVER, NXTHDR, TVER.

The key validation module 192 is arranged to validate encryption keys such as P_KEY and/or R_KEY.

The request packet processing module 193 is arranged to receive the opcode and the serial number PSN and determine whether the RDMA packet is a valid WRITE request RDMA packet.

The response packet processing module 194 is arranged to receive the opcode and the serial number PSN and determine whether the RDMA packet is a valid read response RDMA packet.

The outputs of modules 191-194 are fed to packet qualification module 195. The packet qualification module 195 determines whether the packet passed various qualification tests executed by modules 191-194 and if so—can:

Allow the header length calculation module 196 (that is also fed with the opcodes of the packet) to determine the length of the metadata 41 in order to enable direct writing of the data 42 to the first application memory 140 while sending the header to the operation system buffer 190 (to be processed by the first software RDMA module 150).

Allow the selection of the target DMA/Queue to process the packet and override any other DMA/queue selection in the system that was not related to RDMA processing.

Send direct data placement enablement signals to DMA controller 114 that allow the DMA controller 114 to directly write the data to the first application memory 140.

Enable the trimming of fields at the end of the packets (for example CRC) to enable the DMA to write only the relevant data The address translation module 199 is arranged to receive a virtual address (VA) from metadata 41 and perform a logical to physical address—the physical address points to an entry of the first application memory.

The multiplexer 199' can select between the address outputted by the address translation module 199 and an output provided from the RESPONSE packet processing module 194.

The RESPONSE packet processing holds the READ REQUESTS outstanding FIFO, this FIFO contains information from the transmitted READ REQUESTs waiting to be matched with the READ RESPONSE (which include the read data). this outstanding FIFO with the REQUEST information can also include additional information like address where to put the read data and selection which address to use.

For received WRITE REQUEST packets the target address can come from the packet header (standard way) or preconfigured per target queue and incremented for each received packet (to use the target memory as write FIFO).

Figure 4:
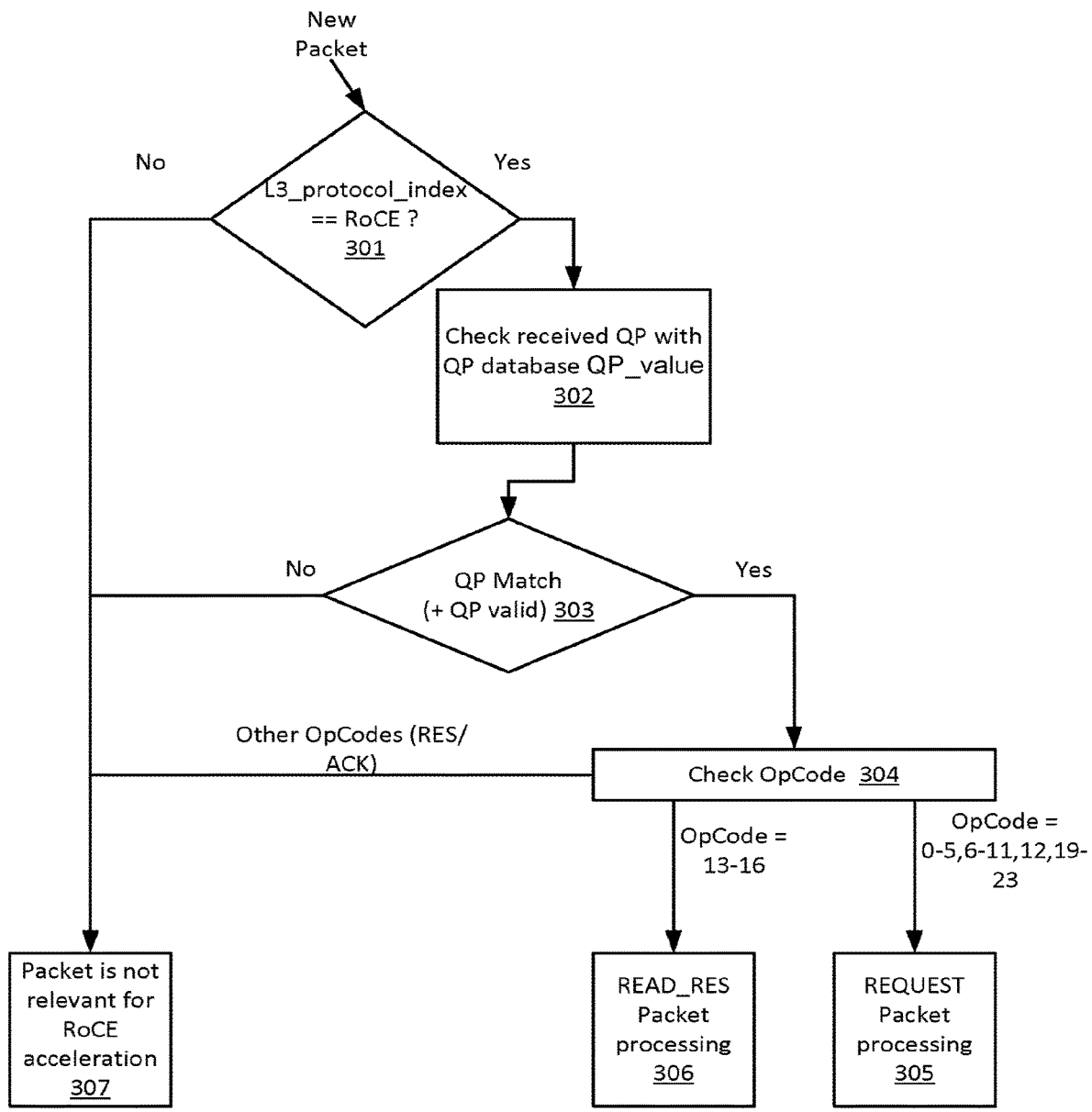
FIG. 4 illustrates a method for processing an RDMA packet according to an embodiment of the invention.

FIG. 4 illustrates a method 300 for processing an RDMA packet according to an embodiment of the invention.

It is assumed that the RDMA protocol is a RoCE protocol.

Method 300 starts by receiving the packet and checking "L3_protocol==RoCE?" (301).

It is noted that the detection of the RDMA (or RoCE protocol can be based on many fields of the packet header not limited to the L3 protocol. It can be detected using internal headers, tunneling protocol headers or for example UDP port.

If not—then the packet is not relevant for RoCE acceleration (307). It may be relevant for acceleration according to another protocol or be deemed to be indirectly written to the first application memory 140.

If is relevant for RoCE acceleration—checking what is the queue associated with the RDMA packet "Check received QP with QP database QP value" (302) and then check if that queue is associated with acceleration "QP match (+QP valid)" (303). If no—jump to stage 307. If so—check opcode (304) to see if this is an opcode that is a candidate for acceleration. If, for example the opcode ranges between 13 to 16 then the RDMA packet is a read response RDMA packet and should undergo read response packet processing (306), if the opcode equals 0-5, 6-12 or 19-23 then the RDMA packet is a write request RDMA packet and should undergo a write request packet processing (305). Other opcodes terminate the method (307).

Figure 5:
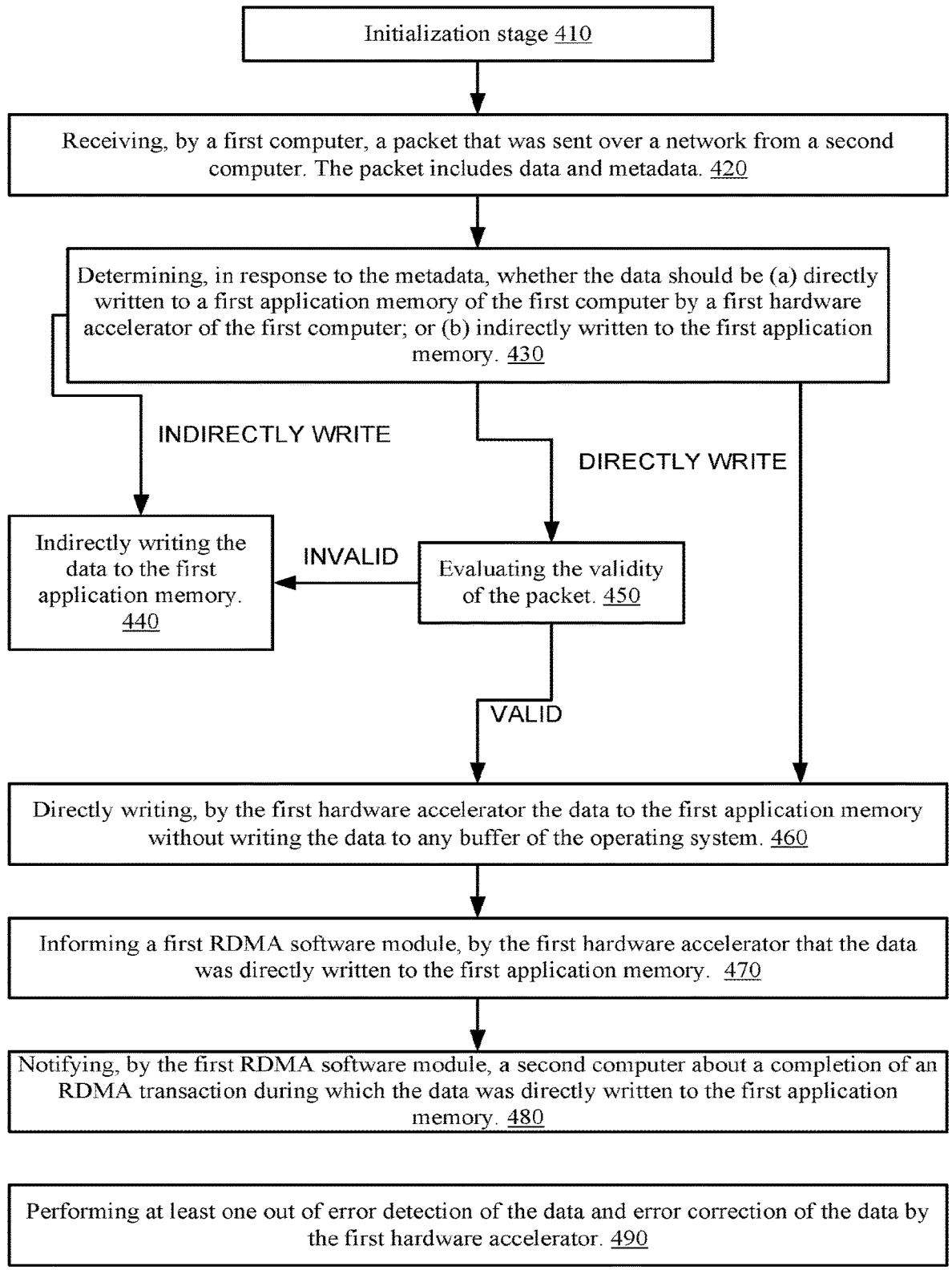
FIG. 5 illustrates a method according to an embodiment of the invention.

FIG. 5 illustrates method 400 according to an embodiment of the invention.

Method 400 may start by an initialization stage 410.

Stage 410 may be followed by stage 420 of receiving, by a first computer, a packet that was sent over a network from a second computer. The packet includes data and metadata.

Stage 420 may be followed by stage 430 of determining, in response to the metadata, whether the data should be (a) directly written to a first application memory of the first computer by a first hardware accelerator of the first computer; or (b) indirectly written to the first application memory.

If determining to indirectly write—stage 430 is followed by stage 440 of indirectly writing the data to the first application memory. This may include allowing a software RDMA module to perform the writing to the application memory, after the packet has been written to an operating system memory.

According to an embodiment of the invention if determining to directly write—stage 430 is followed by stage 460 of directly writing, by the first hardware accelerator the data to the first application memory without writing the data to any buffer of the operating system.

According to another embodiment of the invention if determining to directly write then stage 430 may be followed by stage 450 of evaluating the validity of the packet. If the packet is valid continuing to stage 460—else (packet invalid) jumping to stage 440.

Stage 460 is followed by stage 470 of informing a first RDMA software module, by the first hardware accelerator that the data was directly written to the first application memory.

Stage 470 may include sending the metadata to a buffer that is accessible by the first RDMA software module and providing an indication (for example by amending the metadata or adding new metadata) that the data was directly written by the hardware accelerator. This may prevent the first RDMA software module from indirectly writing (or copying) the data by the first RDMA software module after the data was directly written to the first application memory.

Stage 470 is followed by stage 480 of notifying, by the first RDMA software module, a second computer about a completion of an RDMA transaction during which the data was directly written to the first application memory.

Stage 430 may include at least one out of the following stages: extracting from the metadata a target address within the first application memory to which to write the data; determining whether to directly write the data in response to the target address; determining to directly write the data to the first application memory if the metadata comprises a write request RDMA operation code; determining to directly write the data to the first application memory if the metadata comprises a read response RDMA operation code; determining to directly write the data to the first application memory if the metadata is indicative that the RDMA transaction is associated with an acceleration allegeable application.

It is noted that for ROCE standard, when receiving a RDMA WRITE REQUESTs the packets includes the data and the address where to write the data. When receiving a RDMA READ RESPONSE, the packet includes the read data BUT the address where to write the read data is not part of the RESPONSE packet, it is provided by the application to the NIC when it generates the READ REQUEST packet and kept in the outstanding READ REQUEST FIFO waiting to be matched with the received READ RESPONSE packet.

Method 400 may also include stage 490 of performing at least one out of error detection of the data and error correction of the data by the first hardware accelerator.

The following examples illustrate executions of method 400 by computers 100 and 200.

First example—READ request from second application 280 to first computer 110.

Stage 410 will include:

Second application 280 generates a READ command including local address (in 240) where to store the read data and a destination address (location in 140).

The SW RDMA module sends the local address to the hardware accelerator.

The SW RDMA module 250 generates a RDMA read request packet that is sent to first computer 100.

First NIC 110 receives the RDMA read request packet, reads the data from the destination address (in first application memory 140), generates an RDMA read response packet and sends the RDMA read response packet to second computer 200. This may involve address translation.

The second NIC 210 receives the RDMA read response packet during stage 420.

The data included in the RDMA read response packet is processed according to stages 430, 440, 450, 460, 470, 480 and 490 of method 400 by the second computer 200. The data included in the RDMA read response packet is directly or indirectly written to the local address in the second application memory 240. The second software RDMA module 250 notifies the first NIC 110 that the data was read.

Second example—WRITE request from second application 280 to first computer 110.

Stage 410 will include:

Second application 280 generates a WRITE command including local address (in 240) from where to take the data to be written and a destination address (location in 140).

Second NIC 210 generates a RDMA write request packet and sends it to first computer 100. The RDMA write request packet includes the data taken from the local address and includes metadata such as the destination address, opcode and the like.

The data included in the RDMA write request packet is processed according to stages 430, 440, 450, 460, 470, 480 and 490 of method 400 by the second computer 200. The data included in the RDMA read response packet is directly or indirectly written to the local address in the second application memory 240. The second software RDMA module 250 notifies the first NIC 110 that the data was read.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
receiving, by a processing device, a first packet that was sent over a network, wherein the first packet comprises metadata indicative of acceleration;
selecting, by the processing device, a first queue to process the first packet, wherein the first queue is part of a plurality of queues maintained by the processing device, the first queue being associated with a first datapath having fewer storage stages than a second datapath associated with a second queue in the plurality of queues;
writing, by the processing device, first data of the first packet to an application memory using the first datapath;
amending, by the processing device, the metadata to generate amended metadata after the first data has been written to the application memory, wherein the amended metadata indicates that the first data has been written to the application memory; and
sending, by the processing device, the amended metadata to a software accessible buffer.

2. The method of claim 1, further comprising:
receiving, by the processing device, a second packet that lacks the metadata indicative of acceleration;
selecting, by the processing device, the second queue to process the second packet; and
writing, by the processing device, second data of the second packet to the application memory using the second datapath.

3. The method of claim 1, further comprising:
validating constant fields in the metadata of the first packet.

4. The method of claim 1, further comprising:
determining a length of the metadata.

5. The method of claim 1, wherein the first packet includes an opcode and a packet serial number.

6. The method of claim 1, wherein the metadata indicative of acceleration is an opcode having a value with a predetermined opcode range.

7. The method of claim 1, wherein the metadata indicative of acceleration is a port number.

8. The method of claim 1, further comprising:
extracting from the metadata a target address within the application memory to write the first data.

9. The method of claim 1, wherein the second datapath includes an operating system buffer, and the first datapath excludes the operating system buffer.

10. The method of claim 1, wherein the first datapath is associated with remote direct memory access (RDMA).

11. An integrated circuit device comprising:
a network interface configured to receive a first packet that was sent over a network, wherein the first packet comprises metadata indicative of acceleration; and
hardware acceleration circuitry configured to:
select a first queue to process the first packet, wherein the first queue is part of a plurality of queues maintained by the integrated circuit device, the first queue being associated with a first datapath having fewer storage stages than a second datapath associated with a second queue in the plurality of queues;
write first data of the first packet to an application memory using the first datapath;
amend the metadata to generate amended metadata after the first data has been written to the application memory, wherein the amended metadata indicates that the first data has been written to the application memory; and
send the amended metadata to a software accessible buffer.

12. The integrated circuit device of claim 11,
wherein the network interface is further configured to receive a second packet that lacks the metadata indicative of acceleration, and
wherein the hardware acceleration circuitry is further configured to select the second queue to process the second packet, and write second data of the second packet to the application memory using the second datapath.

13. The integrated circuit device of claim 11, wherein the hardware acceleration circuitry is further configured to validate constant fields in the metadata of the first packet.

14. The integrated circuit device of claim 11, wherein the hardware acceleration circuitry is further configured to determine a length of the metadata.

15. The integrated circuit device of claim 11, wherein the first packet includes an opcode and a packet serial number.

16. The integrated circuit device of claim 11, wherein the metadata indicative of acceleration is an opcode having a value with a predetermined opcode range.

17. The integrated circuit device of claim 11, wherein the metadata indicative of acceleration is a port number.

18. The integrated circuit device of claim 11, wherein the hardware acceleration circuitry is further configured to extract a target address from the metadata.

19. The integrated circuit device of claim 11, wherein the second datapath includes an operating system buffer, and the first datapath excludes the operating system buffer.

20. The integrated circuit device of claim 11, wherein the first datapath is associated with remote direct memory access (RDMA).

* * * * *